Figure 1:
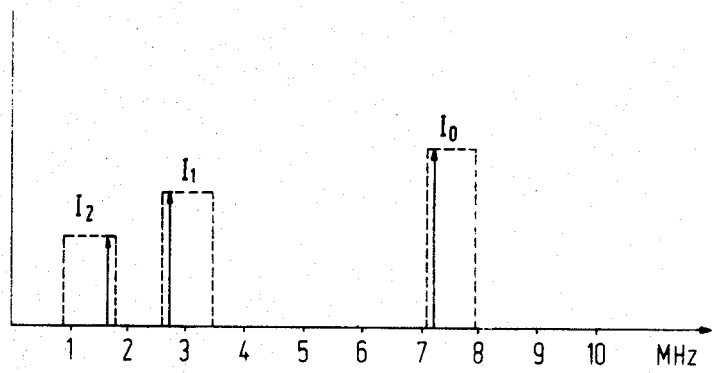

United States Patent [19]

Kahlman et al.

[11] Patent Number: 4,642,702
[45] Date of Patent: Feb. 10, 1987

[54] APPARATUS FOR TIME BASE CORRECTION

[75] Inventors: Josephus A. H. M. Kahlman; Adrianus H. Hoogendijk, both of Eindhoven, Netherlands

[73] Assignee: U.S. Philips Corporation, New York, N.Y.

[21] Appl. No.: 630,493

[22] Filed: Jul. 13, 1984

[30] Foreign Application Priority Data

Jul. 15, 1983 [NL] Netherlands ............... 8302542

[51] Int. Cl.$^4$ .................. H04N 5/95; H04N 5/781
[52] U.S. Cl. ................................................. 358/322
[58] Field of Search ............. 358/320, 321, 322, 337, 358/338, 339, 341, 343

[56] References Cited

U.S. PATENT DOCUMENTS

| 4,123,774 | 10/1978 | Hjortzberg | 358/12 |
| 4,398,224 | 8/1983 | Watanabe | 358/339 |
| 4,402,021 | 8/1983 | Sonoda et al. | 360/72.2 |
| 4,555,734 | 11/1985 | Fukui | 358/314 |

Primary Examiner—Robert L. Richardson
Attorney, Agent, or Firm—Robert T. Mayer; Algy Tamoshunas

[57] ABSTRACT

A method is described on encoding a recording signal comprising a composite color video signal and a digital audio signal, for recording said signal on and reading it from an optical video disc. The color video signal is frequency-modulated on a carrier in the customary manner, while the audio signal is added to said frequency-modulated signal as a pulse-width-modulated digital signal.

1 Claim, 10 Drawing Figures

APPARATUS FOR TIME BASE CORRECTION

The invention relates to an apparatus for reproducing a recording signal from a record carrier, in particular an optically readable disc-shaped record carrier, which recording signal comprises a composite colour video and a further signal.

Such an apparatus is inter alia known from the article "System coding parameters, mechanics and electro-mechanics of the reflectice video disc player" by P. W. Bögels, published in "IEEE Transactions on Consumer Electronics", November 1976, pages 309-317, which publication is herewith incorporated by reference, wherein said further signal is an audio signal. Taking into account possible crosstalk of audio information into video information, possible crosstalk of, in particular, lower side bands of the modulated video information into the audio information, and disturbing effects as a result of cross-modulation products, it has been found that the audio information can be accommodated in the form of two carrier waves modulated with the audio information and having frequencies which have beens selected carefully in relation to the video carrier frequencies. For NTSC the frequencies selected for these two carrier waves are 2.3 MHz and 2.8 MHz and that selected for the video carrier wave is 8.1 MHz (black-level frequency).

The known apparatus provide an excellent video reproduction quality and an acceptable audio reproduction quality.

An earlier, U.S. application Ser. No. 488,573, filed Apr. 25, 1983, discloses an apparatus for reproducing a recording signal from a record carrier, in particular an optically readable disc-shaped record carrier, which recording signal comprises a composite colour video signal and a further signal formed by a digital signal comprising a bit stream of data bits which each can assume a limited number of discrete values. The recording signal is recorded on the record carrier in the form of a carrier wave having a frequency in the range of 6.5-9.3 MHz, which carrier is frequency-modulated by the composite colour video signal, which frequency-modulated signal is pulse-width modulated by the digital signal. The digital signal occupies a frequency band below the first-order sideband of the frequency-modulated carrier signal. The apparatus also comprises an FM-demodulator for recovering the composite colour video signal, a pulse-width demodulator for recovering the digital signal, and a video time base reference-signal generator, by means of which an improved audio reproduction quality can be achieved, because:

the digital audio signal can be accommodated in the frequency band below the necessarily present first-order lower side band of the modulated video carrier, so that crosstalk of the audio signal into the video signal can be limited, the second-order lower side band and possibly a higher-order lower side band of the modulated video carrier, which canoot be filtered out in advance because it is caused by inter alia the pulse-width modulation and lies within the frequency spectrum of the digital audio signal, need not be disturbing because a digital signal is more immune to disturbances by analogue signals of comparatively low amplitude, the intermodulation components need not be disturbing because the relative amplitude of the digital signals may be comparatively small because a substantially smaller signal-to-noise ratio is permissible with digital signals than with analogue signals.

It is noted here that it is possible to accommodate a digital signal representing digital data instead of a digital signal representing analogue audio.

In the apparatus described in said earlier application a first circuit for supplying a first reference frequency which is related to a repetition frequency of 44.1 kHz for decoding the digital signal, a second circuit for supplying a second reference frequency which is related to the horizontal synchronizing frequency of said video signal, and a frequency generator which supplies a third reference frequency to which the first and second reference frequencies are locked, is provided.

When this method of generating the second and third reference frequencies is used during recording, the first reference frequency is locked to the second reference frequency by employing a common frequency reference. During reproduction the two frequencies are then recovered by frequency division. Since the specified second reference frequency can never be recovered exactly by division, an error arises which can be compensated for by introducing a compensating frequency-error during recording. This compensating frequency-error, however, accumulates, which leads to a time shift of the audio signal with respect to the video signal, so that the "lip synchronism" (the synchronism of the sound with the lip movements of persons in the picture) may be impaired. Depending on the magnitude of the error the method described sometimes cannot be utilized. An apparatus is accordance with the invention in which no time shift occurs in generating the first and second reference frequencies may be characterized by a video-time-base signal separating circuit for extracting a video-time-base signal from the demodulated colour video signal, a phase-comparator circuit for comparing the video-time-base signal with the video-time-base reference signal and supplying a control signal as a function of the phase difference, a speed-control circuit for controlling the speed of transport the record carrier as a function of said control signal in order to eliminate video-time-base errors, a controllable oscillator circuit for supplying a signal which is related to a repetition frequency of the digital signal, and a control loop for locking said oscillator circuit to a data-time-base signal which is derivable from the digital signal.

By controlling the drive in such a way that the video time base is correct, the digital signal will also be available with a highly stable time base and the first reference frequency can be derived directly from the digital signal.

Figure 2:
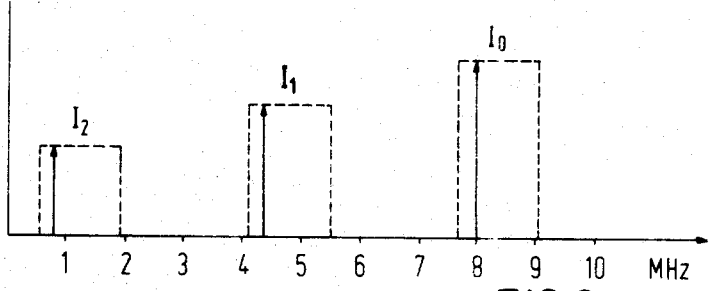

The invention will now be described in more detail, by way of example, with reference to the drawings, in which:

FIG. 1 schematically shows the principal components of the spectrum of the frequency-modulated carrier signal for a video signal in conformity with the PAL standard, FIG. 2 schematically shows the principal components of the spectrum of the frequency-modulated carrier signal for a video signal in conformity with the NTSC standard.

Figure 8:
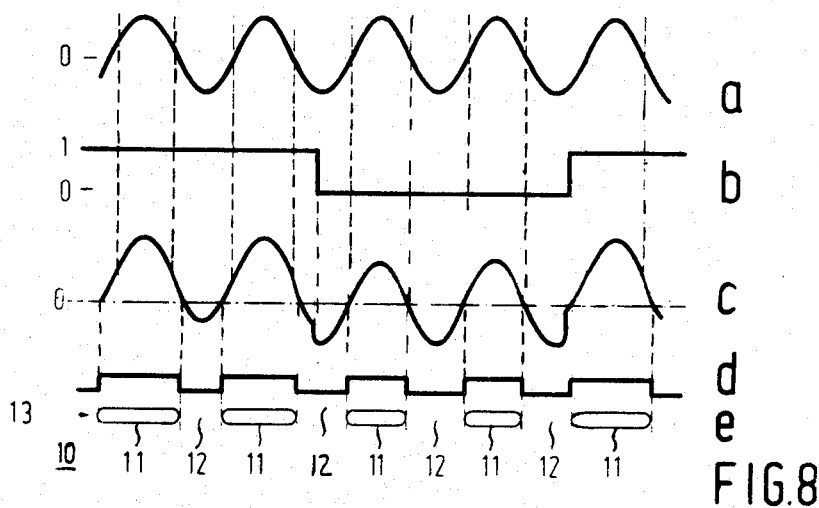
Figure 3:
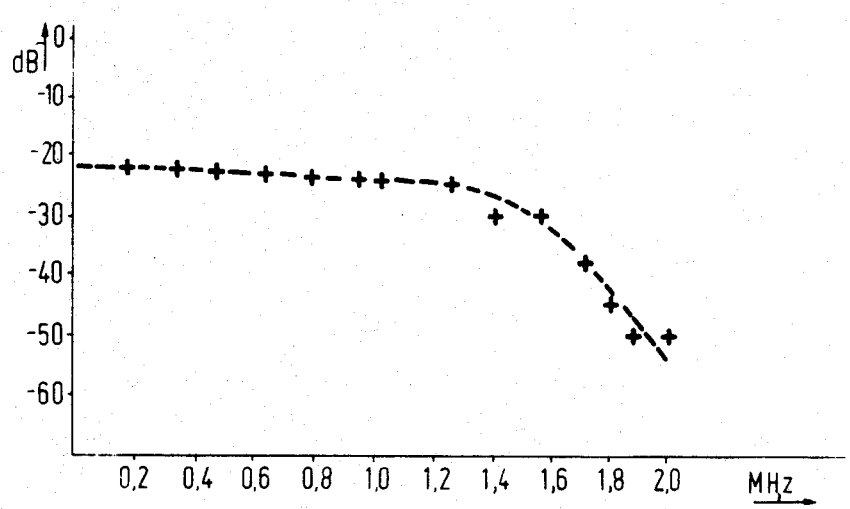
Figure 4:
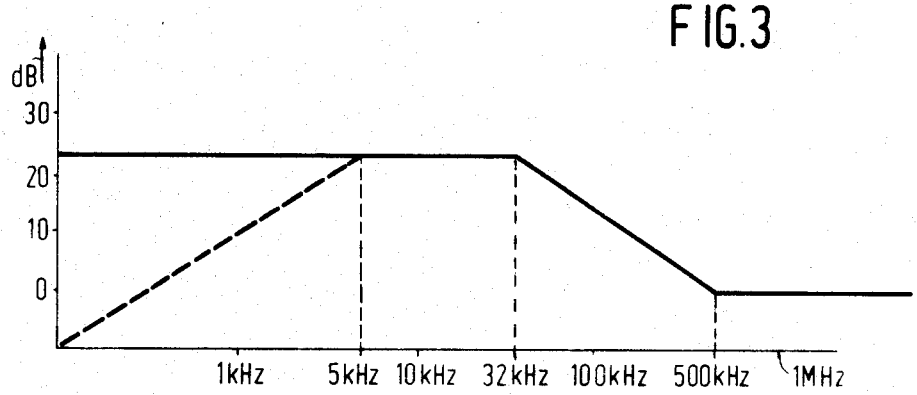
Figure 5:
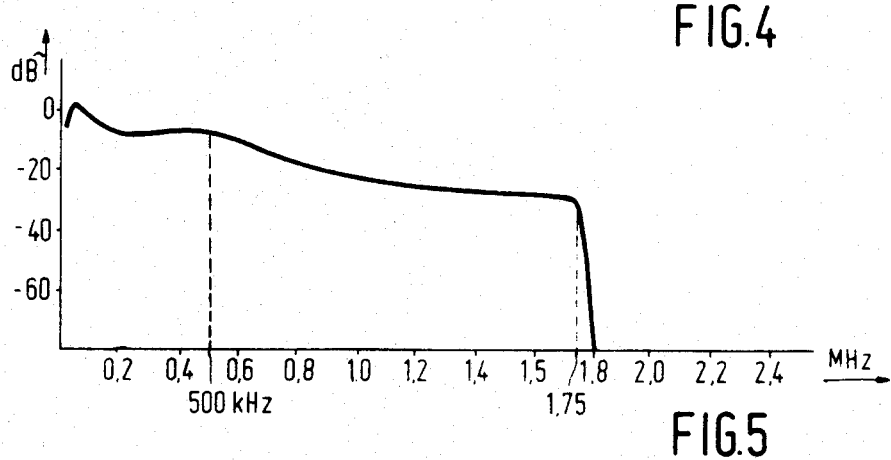
Figure 6:
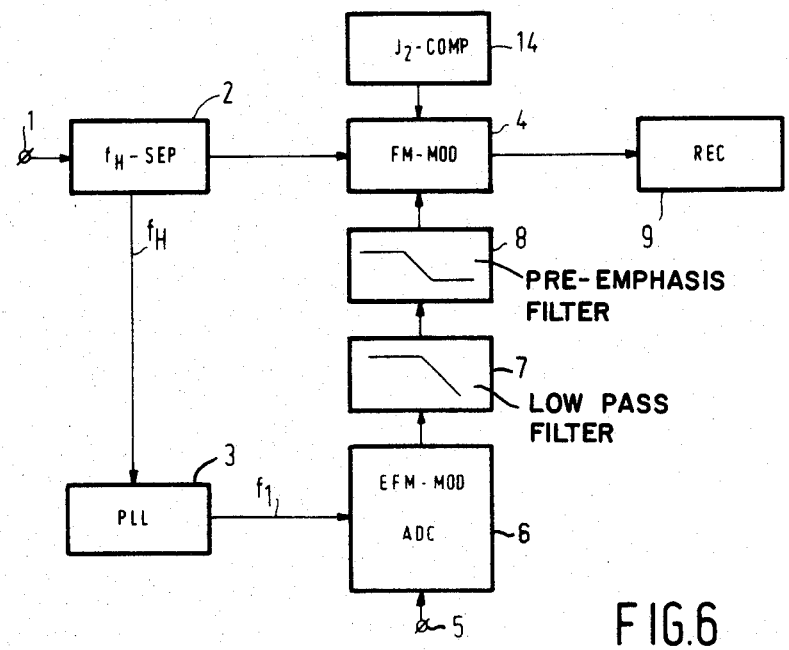
Figure 7:
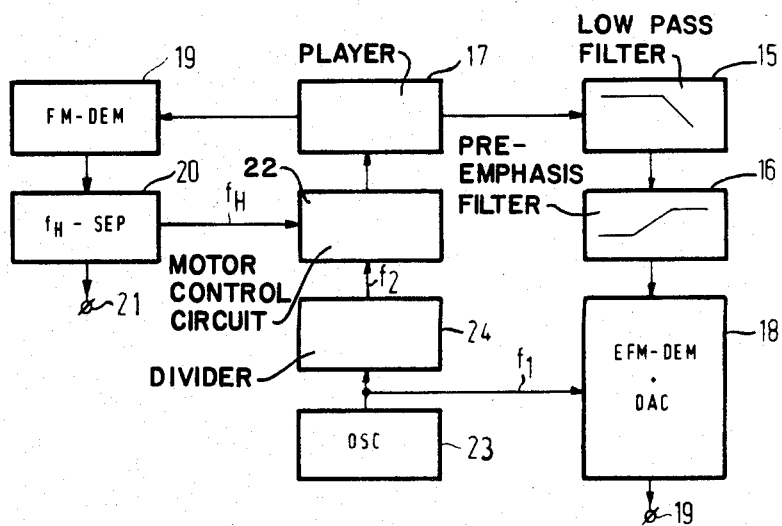
Figure 9:
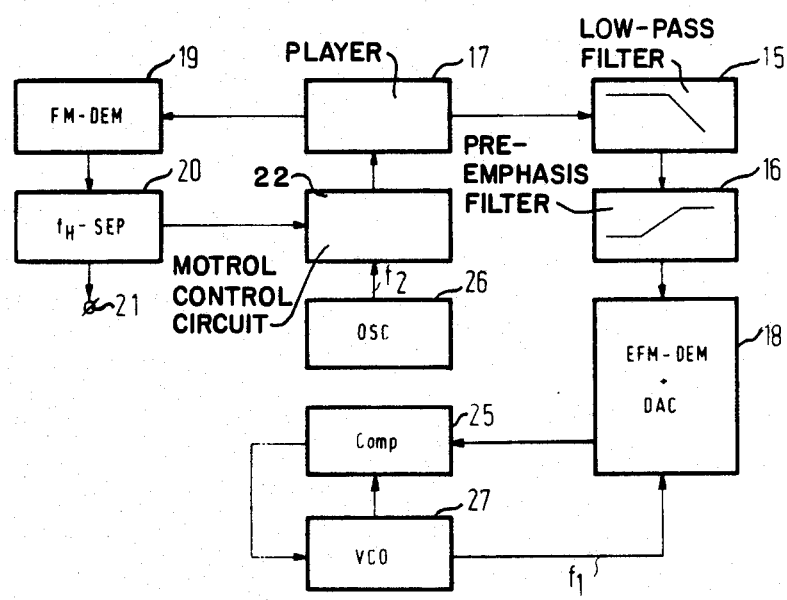
Figure 10:
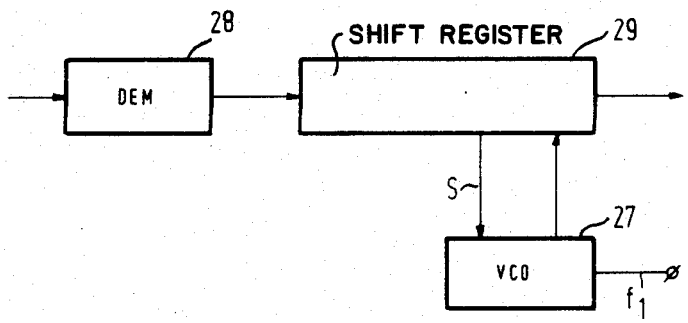

FIG. 3 is a graph indicating the relative level of a pulse-width modulation of the frequency-modulated carrier signal, for which level visible interference occurs in the reproduced video picture, as a function of the frequency, FIG. 4 shows the frequency diagram of a low-frequency pre-emphasis filter, FIG. 5 shows the spectrum of the EFM-modulated digital signal after having passed through the low-pass filter and the low-frequency pre-emphasis filter, FIG. 6 shows an apparatus for encoding a recording signal, FIG. 7 shows an apparatus for reproducing a recording signal encoded by the apparatus of FIG. 6, FIG. 8 shows some diagrams to illustrate the operation of the pulse-width modulator used in the apparatus shown in FIG. 6, FIG. 9 is an alternative to the apparatus shown in FIG. 7 according to the invention, FIG. 10 is an alternative to a part of the apparatus shown in FIG. 9.

FIG. 1 shows the spectrum of a PAL-video signal which is frequency modulated on a 7.1 MHz carrier (frequency in the case of modulation by the black level of the video signal), where $I_0$ is the principal component which represents the frequency as a function of the amplitude of the video signal, $I_1$ is the first-order lower side-band, also referred to as the chroma band, which is situated at 4.43 MHz from the principal component $I_0$, 4.43 MHz being the frequency of the chrominance carrier in the video signal, and $I_2$ is the second-order side band which is mirror-inverted relative to the frequency zero point and which is situated at a distance of 8.86 MHz from the zero point. In the known apparatus two frequency-modulated audio carriers of 0.683 and 1.066 MHz are added to this signal.

FIG. 2 shows the spectrum of an NTSC video signal which is frequency-modulated on a carrier wave of 8.1 MHz (frequency in the case of modulation by the black level of the video signal). Since in an NTSC-signal the chrominance carrier has a frequency of 3.58 MHz, the lower side bands $I_1$ and $I_2$ are now spaced at distances of 3.58 and 7.16 MHz, respectively. In the known apparatus the audio signals are added as FM-carriers at 2.3 and 2.8 MHz.

FIG. 3 shows the results of a measurement of the effect of a pulse-width modulation of the carrier which is frequency modulated by the video signal (in the present case PAL) on the picture quality. The relative amplitude of the signal with which the carrier is pulse-width modulated is plotted, showing the influence on the picture as a function of the frequency. The graph shows that this influence remains fairly constant up to approximately 1.5 MHz and increases above this frequency. It follows from the graph that pulse-width modulation may be applied with a maximum signal level when this signal is passed through a low-pass filter having a cut-off frequency in the range from 1.5 to 2 MHz.

In optical recording the He-Ne laser gives rise to a degraded signal-to-noise ratio at low frequencies. Since for the coding method in accordance with the invention a comparatively weak signal strength of the digital audio signal is desirable, it is advantageous to emphasize the signal strength for low frequencies in comparison with the signal strength for higher frequencies. A suitable cut-off frequency is situated in the range of 100 kHz–1 MHz, in particular at 500 kHz, because at 500 kHz the EFM-spectrum exhibits a maximum and rolls off below this frequency.

FIG. 4 shows the frequency diagram of a suitable low-frequency pre-amphasis filter. The cut-off frequency is situated at 500 kHz. Below this frequency the signal strength is boosted by 6 dB/octave, which is easy to achieve. The cross-over frequency at which the characteristic becomes flat again (in the present case for example at approximately 32 kHz) is determined by the pre-emphasis level for low frequencies, which level is dictated by the limit of visibility (FIG. 3) and its possible influence on control systems such as the radial tracking. In the present example the pre-emphasis is approximately 23 dB.

FIG. 5 shows the resulting EFM-spectrum after low-pass filtering with a cut-off frequency of 1.75 MHz and after the passage through a low-frequency pre-emphasis filter having a characteristic as shown in FIG. 4. This spectrum rises gradually with approximately 23 dB up to 500 kHz, after which the low-frequency pre-emphasis filter ensures that the spectrum remains substantially constant down to very low frequencies. This spectrum thus obtained can be accommodated in the frequency band below the $I_1$ component (FIGS. 1 and 2) without any significant problems, whilst in the case of an NTSC-signal the two audio FM-carriers can be maintained, so that it is possible to manufacture a record carrier with both digital audio and FM-audio, which can be read on both types of player.

In FIG. 4 a broken line represents a frequency roll-off for frequencies lower than, for example, 4 kHz, which may be useful in order to prevent the various low-frequency control systems from being disturbed.

FIG. 6 shows an apparatus for encoding a recording signal. It comprises an input 1 for receiving a composite video signal. By means of a sync-separator 2, a signal of a frequency ($f_h$) equal to the frequency for the horizontal synchronizing signals in the composite video signal is extracted and applied to a frequency generator 3 which comprises, for example, a phase-locked loop. This frequency generator 3 supplies a signal of a frequency $f_1$ for the processing of the digital audio signal, in the present example a signal of a frequency of 4.2336 MHz ($=96 \times 44.1$ kHz; 44.1 kHz being the sampling frequency of the analogue audio signal). Moreover, the composite video signal is applied to an FM-modulator 4, for example a voltage-controlled oscillator which is controlled by the video signal. Subsequently, the FM-signal is fed to a device 9 which in a manner known per se records the FM-signal on a record carrier, in particular a video disc, by means of a laser.

The analogue audio signal is applied to the signal processing unit 6, which inter alia comprises an analogue-digital converter and an EFM-modulator, and which may be of a type as described in the article in "Philips Technical Review" mentioned in the introductory part. This processing unit receives the signal of the frequency $f_1 = 4.2336$ MHz from the generator 3 for synchronizing the signal processing. The EFM-modulated signal is subsequently passed through a low-pass filter 7 having a cut-off frequency of 1.75 MHz and through a low-frequency pre-emphasis filter 8 having a characteristic as shown in FIG. 9 and is then applied to a pulse-width control input of the FM-modulator 4. In its simplest form this pulse-width control is obtained by addition prior to limiting, which will be explained with reference to FIG. 8.

FIG. 8a shows a signal, in the present case a sinewave signal, representing the frequency-modulated composite video signal. FIG. 8b shows a digital signal having a frequency lower than the frequency of the video signal a and having a lower amplitude. FIG. 8c shows the sum of these two signals. If after suitable amplification this signal is limited, a signal as shown in FIG. 8d is obtained. This signal is a square-wave signal with a repetition frequency corresponding to the instantaneous frequency of the frequency-modulated video signal and a relative pulse-width corresponding to the digital signal. If this signal d controls a laser which inscribes an optically readable disc 10, this results in a pattern as shown in FIG. 8e, comprising a track 13 of optically detectable areas 11 of a length corresponding to the pulses in the signal shown in FIG. 8d and intermediate areas 12.

In order to compensate for the second order lower sideband $I_2$ a compensation circuit 14 may be added to the pulse-width modulator, for example a circuit as described in U.S. Pat. No. 4,322,342.

FIG. 7 shows an example of an apparatus for decoding a signal which has been encoded by means of the apparatus shown in FIG. 6. The first-mentioned apparatus comprises a player 17 which reads the record carrier. The output signal is applied to a low-pass filter 15 which functions as pulse-width demodulator. Indeed, the signal shown in FIG. 8a can be filtered out of the signal shown in FIG. 8d by means of a low-pass filter having a cut-off frequency situated between the frequency bands occupied by these signals. The digital audio signal thus obtained is passed through a high-frequency pre-emphasis filter 16 which is complementary to the low-frequency preemphasis filter 8 (FIG. 6) and subsequently it is converted into an analogue signal by means of a circuit 18 comprising an EFM-demodulator and a digital-to-analogue converter, the signal processing being synchronized by a reference frequency $f_1$. The circuit 18 may be as described in the afore-mentioned issue of "Philips Technical Review" and may comprise IC's which are commercially available under the type numbers SAA 7000, SAA 7020, SAA 7030, MAB 8410, TDA 1540 and random access memory 6116. The analogue audio signal (in stereo version) is then available on output 19. The output signal of the player 17 is also applied to an FM-demodulator 19, whose output signal is transferred to an output 21 via a sync-separator circuit 20. The extracted synchronizing signal, the horizontal synchronizing signal of frequency $f_H$, is applied to a motor control circuit 22, which controls the speed of the player 17 in such a way that the frequency $f_H$ corresponds to a reference frequency $f_2$ within narrow limits.

In principle, the reference frequencies $f_1$ and $f_2$ may be supplied by two separate generators. However, this is problematic because stringent requirements must be imposed on the stability and the mutual relationship of these two reference frequencies. This may be solved by deriving the two frequencies from one reference oscillator 23 using frequency division, so that the phase-locked loops, which are not stable enough, may be dispensed with.

In the embodiment shown in FIG. 7 the oscillator 23 is tuned directly to the frequency $f_1$ and $f_2$ is obtained by dividing the frequency $f_1$ by means of a divider stage 24. For PAL the frequency $f_2$ must be 15.625 kHz, whilst $f_1$ must be 4.2336 MHz (96 times the sampling frequency of 44.1 kHz) within specific tolerances when said IC's are used. It has been found that this is possible by tuning the oscillator to 4.234375 MHz and dividing it by 271, so that $f_2$ has exactly the correct value and $f_1$ has a deviation of $2.10^{-4}$, which is acceptable for the required reproduction quality.

For NTSC acceptable values are obtained by using an oscillator 23 which is tuned to 4.232518 MHz and a divider 24, which divides by 269. A deviation of $10^{-4}$ for the frequency $f_1$ is then found.

However, the slight deviations of these frequencies may give rise to a timing error in the decoding of the audio signal. Indeed, when the digital signal is decoded with a different frequency than that with which it has been encoded, a timing error arises which accumulates in reproduction. This may be compensated for by introducing a corresponding timing error during encoding, for example by means of a sampling-frequency conversion. However, during recording this compensation results in a time shift between the picture and sound which increases as the length of the recording increases. If this shift exceeds specific limits, this becomes perceptible during reproduction in that the picture and sound are no longer in "lip synchronism" i.e. the sound uttered by a person is visibly non-synchronous with the lip movements. An alternative which does not give rise to this problem, is to rigidly interlock the two reference frequencies $f_1$ and $f_2$ required during recording without compensation and to use the apparatus shown in FIG. 9 during reproduction. In contradistinction to the apparatus shown in FIG. 7, this apparatus generates the reference frequency $f_2$ directly by means of an oscillator 26, the generation not being locked to the generation of the reference frequency $f_2$, and the reference frequency $f_1$ is generated by a controllable oscillator 27, which via comparator 25, for example a phase comparator, is locked to a reference derived from the digital signal. A possibility of achieving this interlock is obtained by modifying the circuit described on page 155, FIG. 3 of the issue of "Philips Technical Review" mentioned in the introductory part, in which in the case of Compact-Disk-Digital-Audio the demodulated digital signal is shifted in a register in the rhythmin which it is received and is shifted out of this register by means of a constant clock signal, so that the time base is restored. A signal which is a measure of the degree of filling of the register is then a measure of the synchronism between the rhythm of reception of the digital signal and the constant clock signal, by means of which signal the disk-drive motor is controlled. Thos modification to said principle for use in the apparatus shown in FIG. 9 is shown in FIG. 10. The EFM-modulated digital audio signal is applied to a demodulator 28 whose output signal, which is the demodulated digital signal, is shifted into a shift register 29 in the rhythm with which it is received, said signal being taken from this register in the rhythm of the controlled oscillator 27. A signal S which is a measure of the degree of filling of the register 29 controls the oscillator 27, so that the output of the digital signal is in synchronism with the input. In this way the signal $f_1$ on the output of the oscillator 27 is in synchronism with the digital audio signal.

What is claimed is:

1. An apparatus for reproducing a recording signal from a record carrier, in particular an optically readable disc-shaped record carrier, which recording signal comprises a composite colour video signal and a further signal formed by a digital signal comprising a bit stream of data bits which each can assume a limited number of discrete values, said recording signal being recorded on the record carrier in the form of a carrier wave having a frequency in the range of 6.5–9.3 MHz, which carrier is frequency-modulated by the composite colour video signal, which frequency-modulated signal is pulse width modulated by the digital signal, said digital signal occupying a frequency band below the first-order sideband of the frequency-modulated carrier signal, which apparatus comprises an FM-demodulator for recovering the composite colour video signal, a pulse-width demodulator for recovering the digital signal, a video-time-base reference-signal generator, a video-time-base signal separating circuit for extracting a video-time-base signal from the demodulated colour video signal, a phase-comparator circuit for comparing the video-time-base signal with a video-time-base-reference signal and producing a control signal as a function of the phase difference, a speed-control circuit for controlling the speed of transport of the record carrier as a function of said control signal in order to eliminate possible video-time-base errors, a controllable oscillator circuit for supplying a signal which is related to the bit frequency of the digital signal and a control loop for locking the oscillator circuit to a data time-base signal which is derivable from the digital signal.

* * * * *